United States Patent [19]

Tanaka et al.

[11] Patent Number: 4,806,024

[45] Date of Patent: Feb. 21, 1989

[54] ROTATABLY SUPPORTING STRUCTURE

[75] Inventors: Shinsaku Tanaka, Tokyo; Toshio Yoshimura, Kawasaki, both of Japan

[73] Assignee: Tanashin Denki Co., Ltd., Japan

[21] Appl. No.: 134,594

[22] Filed: Dec. 16, 1987

Related U.S. Application Data

[63] Continuation of Ser. No. 925,554, Oct. 31, 1986, abandoned.

[51] Int. Cl.$^4$ .............................................. F16C 17/10
[52] U.S. Cl. .................................... 384/125; 384/296; 384/539
[58] Field of Search ............... 384/220, 539, 903, 275, 384/296, 295, 428, 125

[56] References Cited

U.S. PATENT DOCUMENTS

| | | | |
|---|---|---|---|
| 3,454,314 | 7/1969 | Sauguinetti | 384/539 |
| 4,350,398 | 9/1982 | Schulz et al. | 384/903 |
| 4,555,188 | 11/1985 | Neal | 384/903 |
| 4,606,657 | 8/1986 | Tanaka | 384/539 |

FOREIGN PATENT DOCUMENTS

| | | |
|---|---|---|
| 0180307 | 5/1986 | European Pat. Off. . |
| 0192387 | 8/1986 | European Pat. Off. . |

*Primary Examiner*—Lenard A. Footland
*Attorney, Agent, or Firm*—Wegner & Bretschneider

[57] ABSTRACT

A rotatably supporting structure is composed in combination of a raised portion and its matching annular recess. The raised portion is provided on either the outer circumferential surface of a shaft, which is adapted to be fixed at one end thereof on a fixed part, or the inner circumferential surface of a central bore of a member to be supported rotatably. The annular recess is formed in either the outer circumferential surface or the inner circumferential surface and is adapted to receive the raised portion therein. A tapered or curved surface is formed on at least one of the raised portion and a portion of the shaft or rotatably supported member defining the annular recess, which portion is brought into contact with the raised portion upon assembly of the rotatably supporting structure. The rotatably supported member is supported at both sides of the raised portion.

5 Claims, 2 Drawing Sheets

ROTATABLY SUPPORTING STRUCTURE

This application is a continuation of U.S. application Ser. No. 925,554, filed Oct. 31, 1986, now abandoned.

BACKGROUND OF THE INVENTION

1. Field of the Invention

This invention relates to a structure for rotatably supporting a rotary member, particularly, of a thin axial thickness such as pulley or gear, which may hereinafter be called "rotatably supporting structure".

2. Description of the Prior Art

In order to support a rotary member such as pulley or gear, it is generally practiced, as shown in FIG. 5 which is an axial cross-section of a typical prior art structure for supporting such a rotary member thereon, to fix one end of a shaft 1 on a fixed member 2 and after fitting the a central bore 4 of a rotary member 3 (a member to be supported rotatably) on the shaft 1, to fit a stopper ring 6 in a ring slot 5 formed in the free end of the shaft 1 so as to prevent the rotary member 3 from slipping off from the shaft 1.

In the case of the rotatably supporting structure depicted as prior art in FIG. 5, two assembly steps are required so that after fitting the rotary member 3 on the shaft 1, the stopper ring 6 is fitted in the ring slot 5. This rotatably supporting structure is however accompanied by a drawback that it cannot be efficiently assembled, especially, because the fitting work of the stopper ring 6 is cumbersome.

Further, it is not advantageous from the viewpoint of cost reduction to use small parts like the stopper ring 6. It has hence been desired to avoid use of such small parts.

In order to fit the stopper ring 6, the free end of the shaft 1 extends out significantly from the rotary member 3 by a length l. This has resulted in an inconvenience that the length of the shaft 1 cannot be shortened to any significant extent even if the rotary member 3 is made thinner.

In order to avoid the outward extension of the shaft 1 from the rotary member 3, it is also practiced, as shown in FIG. 6, to enlarge the central bore 4 of the rotary member 3 from its axially intermediate portion to its end face so as to form a large-diametered recess 7 and then to secure the rotary member 3 on the shaft 1 via a washer 8 within the large-diametered recess 7. This design however leads to a reduction to the supporting length L of the shaft 1 for the rotary member 3 by a length equivalent to the depth of the large-diametered recess 7, so that the axis of the shaft 1 and that of the rotary member 3 may not be coincided, in other words, the rotary member 3 may not be rotated smoothly.

SUMMARY OF THE INVENTION

With the foregoing in view, the present invention provides as its principal object the provision of a rotatably supporting structure which permits 1-step (i.e., one-touch) mounting of a rotary member (a member to be supported rotatably) on a shaft and hence allows efficient assembly work, can obviate a stopper ring and can hence materialize a cost reduction, and can avoid easily the projection of the shaft from the member supported rotatably thereon without reducing the supported length of the rotatably supported member, in other words, while ensuring smooth rotation of the rotatably supported member.

In one aspect of this invention, there is thus provided a rotatably supporting structure which comprises:

a raised portion provided on either the outer circumferential surface of a shaft, which is adapted to be fixed at one end thereof on a fixed part, or the inner circumferential surface of a central bore of a member to be supported rotatably;

an annular recess formed in either the outer circumferential surface or the inner circumferential surface and adapted to receive the raised portion therein; and a tapered or curved surface formed on at least one of the raised portion and a portion of the shaft or rotatably supported member defining the annular recess, which portion is brought into contact with the raised portion upon assembly of the rotatably supporting structure;

whereby the member is rotatably supported on both sides of the raised portion.

According to the present invention, it is possible to mount the member rotatably on the shaft in one step. This leads to efficient assembly work, and owing to the obviation of the stopper ring, a cost reduction can be achieved. It is also easy to prevent the shaft from projecting out from the member supported rotatably on the shaft. Even in such a construction, the supported length of the member supported rotatably by the shaft is not reduced and the rotatably supported member is therefore assured to rotate smoothly.

BRIEF DESCRIPTION OF THE DRAWINGS

The above and other objects, features and advantages of the present invention will become apparent from the following description and the appended claims, taken in conjunction with the accompanying drawings, in which:

FIG. 5 is a cross-sectional view of a rotatably supporting structure of a conventional type; and FIG. 6 is a cross-sectional view of a rotatably supporting structure of another conventional type.

DETAILED DESCRIPTION OF THE INVENTION AND PREFERRED EMBODIMENTS

Figure 1:
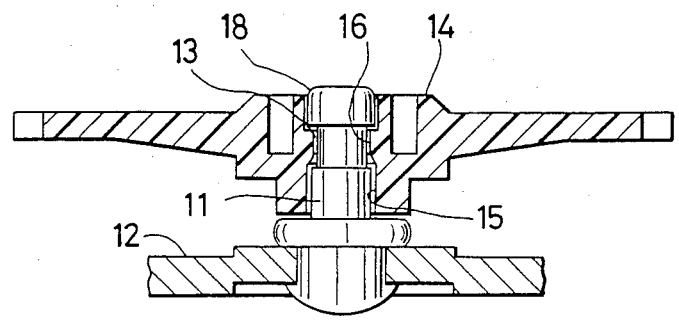
FIG. 1 is a cross-sectional view of a rotatably supporting structure according to a first embodiment of this invention.
Figure 2:
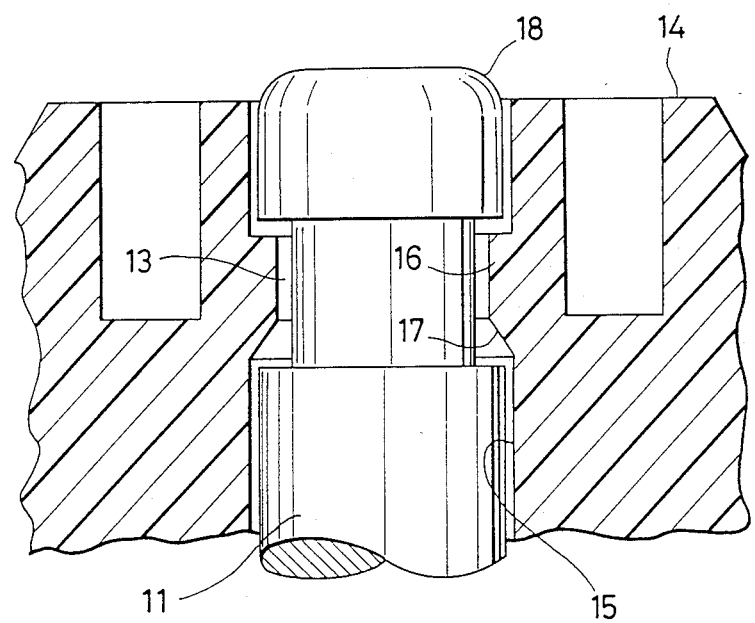
FIG. 2 is an enlarged fragmentary cross-sectional view of the rotatably supporting structure of FIG. 1.

Referring first to FIG. 1 and FIG. 2, the first embodiment of this invention will next be described. A shaft 11 is fixed at one end thereof on a fixed part 12 and an annular groove 13 is formed as an annular recess in the outer circumferential surface of the shaft 11.

On the other hand, an annular ridge 16 is provided as a raised portion on the wall of a central bore 15 formed through a synthetic resin gear 14 depicted as one example of the member to be supported rotatably. The annular ridge 16 is received within the annular groove 13. The shoulder portion of the annular ridge 16, which shoulder portion is located on the side of the fixed end of the shaft 11, is formed in a tapered surface 1. The shaft 11 defines a curved tapered surface 17. A cylindrical groove 21 is formed concentrically around the central bore 15 in gear 14. The cylindrical groove 21 opens to the upper surface of the gear 14 as viewed in FIGS. 1–3. The shaft 11 defines a curved surface (rounded surface) 18 at a site where the shaft is brought into contact with the annular ridge 16 of the gear 14 upon their assembly, namely, at a free end portion of the shaft 11. Accordingly, the gear 14 is rotatably supported at both sides of the annular ridge 16, in other words, at both sides of the annular groove 13.

Figure 3:
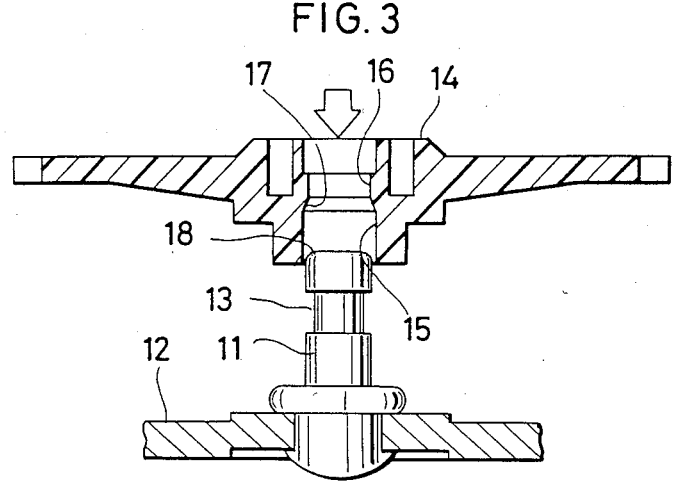
FIG. 3 is a cross-sectional view showing the rotatably supporting structure of the first embodiment in the course of its assembly steps.

The rotatably supporting structure of the above construction can be assembled as shown in FIG. 3, namely, only by bringing the central bore 15 of the gear 14 into registration with the free end of the shaft 11 and then force-fitting the gear 14 axially on the shaft 11 against the elasticity of the material itself of the gear 14. As a consequence, the tapered surface 17 of the annular ridge 16 is brought into sliding contact with the curve surface 18 formed at the free end portion of the shaft 11. As soon as the annular ridge 16 has passed beyond the upper edge of the annular groove 13 as viewed in FIG. 2, the annular ridge 16 falls in the annular groove 13 and is hence received therein so that their assembly is completed. The cylindrical groove 21 facilitates the fitting of the shaft 11 into the central bore 15 of the gear 14. Once they have been assembled in the above-described manner, it is no longer possible to pull the gear 14 out of the shaft 11 because the annular groove 13 and annular ridge 16 are maintained in mutual engagement.

It is hence possible to mount the gear 14 on the shaft 11 in a single step (i.e., by a one-touch operation), thereby permitting efficient assembly work and obviating the stopper ring and as a result, materializing to reduce the manufacturing cost.

It is also feasible with ease to avoid the outward projection of the shaft 11 from the gear 14. This modification does not result in any reduction to the supported length of the gear 14 by the shaft 11. Hence, the gear 14 is still allowed to rotate smoothly. The above modification is effective particularly when the rotatably-supported member, namely, the gear 14 is thin.

Figure 4:
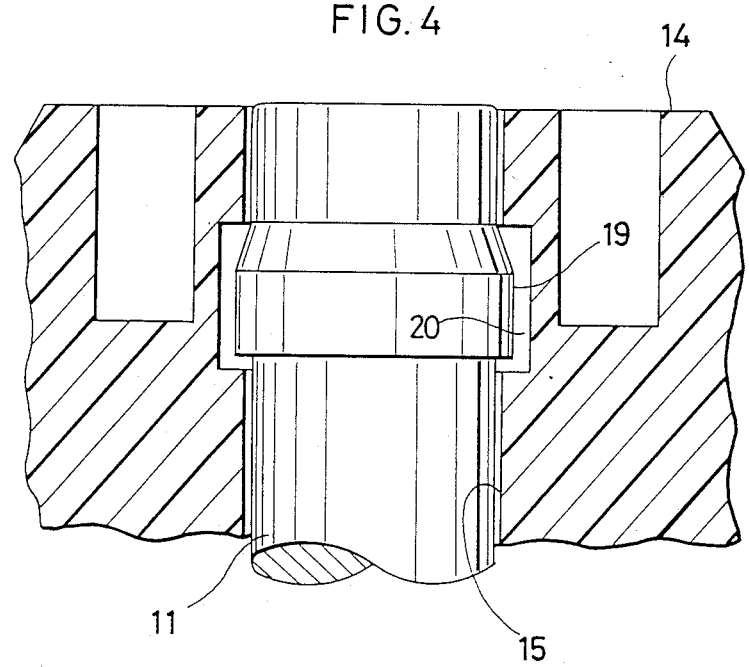
FIG. 4 is a fragmentary cross-sectional view of a rotatably supporting structure according to a second embodiment of this invention.

Reference will next be had to FIG. 4 which illustrates the second embodiment of this invention.

In the second embodiment of this invention, an annular ridge 19 is formed on the outer circumferential surface of the shaft 11 while an annular groove 20 is formed in the inner circumferential surface of the central bore 15 of the gear 14. The annular ridge 19 is received in the annular groove 20. The second embodiment can bring about the same advantages as the above-described first embodiment of this invention. In addition, the second embodiment does not require any curved surface at a free end portion of the shaft 11 because the free end portion of the shaft 11 is not brought into contact with the annular ridge 19. The second embodiment is therefore effective especially when the free end of the shaft 11 is desired not to project out at all from the gear 14.

Two preferred embodiments of this invention have been described by way of example. It should however be borne in mind that the present invention is not limited to or by them. For example, it is not absolutely necessary to form the raised portion, which is provided on either the outer circumferential surface of the shaft or the inner circumferential surface of the central bore of the rotatably supported member, in an annular configuration.

Having now fully described the invention, it will be apparent to one of ordinary skill in the art that many changes and modifications can be made thereto without departing from the spirit or scope of the invention as set forth herein.

We claim:

1. A device for rotatably supporting an elastic member on a shaft, the shaft being coupled at one end to a fixed part, said device comprising:
   means for supporting the member substantially along the entire length of a central bore formed through the member, said means including:
   a raised portion provided on the inner circumferential surface of said central bore of the member;
   a tapered portion formed along a lower end portion of said raised portion;
   an annular recess formed in the outer circumferential surface of the shaft;
   a curved surface formed along an upper end portion of the shaft, said curved surface being brought into contact with said tapered surface to facilitate ease in snap-fitting said shaft longitudinally within said central bore of the member, said raised portion being received in said annular recess once the shaft is fitted within said central bore, with both axial end faces of the member being in contact with the shaft; and
   a cylindrical groove formed in the member, concentric to said central bore, said groove opening onto one of said end faces of the member.

2. The rotatably supporting structure as claimed in claim 1, wherein the rotatably supported member is made of a synthetic resin.

3. A rotatably supporting structure comprising:
   a shaft adapted to be fixed at one end thereof on a fixed part;
   an elastic member rotatably supported on said shaft with both axial central end surfaces of the elastic member, as viewed along the length of the shaft, being in contact with the shaft, said elastic member having a central bore;
   a raised portion provided on one of (1) the outer circumferential surface of said shaft and (2) the inner circumferential surface of said central bore;
   an annular recess formed in the other of said outer circumferential surface and said inner circumferential surface and adapted to receive the raised portion therein;
   at least one of (1) a tapered surface formed on the raised portion, and (2) a curved surface formed on the other end of said shaft; said tapered surface or curved surface being brought into contact with the raised portion upon assembly of the rotatably supporting structure; and
   a cylindrical groove form ⓡd around the central bore in the elastic member and opening in one surface of the elastic member.

4. A rotatably supporting structure comprising:
   a raised portion provided on the outer circumferential surface of a shaft which is adapted to be fixed at one end thereof on a fixed part;
   an annular recess formed in the inner circumferential surface of a central bore of an elastic member, which is to be supported rotatably with both axial central end surfaces of the elastic member, as viewed along the length of the shaft, being in contact with the shaft, and adapted to receive the raised portion therein:
   a tapered or curved formed on at least one of the raised portion and a portion of the rotatably supported member, which portion is brought into contact with the raised portion upon assembly of the rotatably supporting structures; and a cylindrical groove formed around the central bore in the elastic member which opens to one surface of the elastic member;

whereby the member is rotatably supported on both sides of the raised portion.

5. The rotatably supporting structure as claimed in claim 4, wherein the rotatably supported member is made of a synthetic resin.

* * * * *